United States Patent [19]

Stella

[11] 3,856,390
[45] Dec. 24, 1974

[54] PULL-STRIP MECHANISM FOR MULTIPURPOSE FILM CASSETTES

[75] Inventor: Joseph A. Stella, Peabody, Mass.

[73] Assignee: Polaroid Corporation, Cambridge, Mass.

[22] Filed: Dec. 26, 1973

[21] Appl. No.: 428,376

[52] U.S. Cl................ 352/130, 354/313, 354/317, 354/331
[51] Int. Cl.......................................... G03c 11/00
[58] Field of Search ............ 352/130; 354/313, 314, 354/317, 331

[56] References Cited
UNITED STATES PATENTS

| | | | |
|---|---|---|---|
| 3,768,894 | 10/1973 | Cook | 352/130 |
| 3,776,624 | 12/1973 | Land | 352/130 |
| 3,778,140 | 12/1973 | Land | 352/130 |

Primary Examiner—Monroe H. Hayes
Attorney, Agent, or Firm—David R. Thornton

[57] ABSTRACT

A pull-strip mechanism for multipurpose film cassettes of the type in which a photographic film strip is permanently contained for exposure, processing and viewing and having a tear-tab closure for a supply of processing fluid contained in the cassette. The tear-tab closure is joined to a pull-strip of resilient material capable of engaging an aperture in the film strip automatically upon rewind movement after exposure to initiate a processing operation. Slidable keeper means is provided for holding the pull-strip out of engagement with the film strip during exposure but movable by ratchet formations on the periphery of a supply spool upon rewind so as to allow the pull-strip to spring into position to be latched to the film-strip.

17 Claims, 5 Drawing Figures

PULL-STRIP MECHANISM FOR MULTIPURPOSE FILM CASSETTES

BACKGROUND OF THE INVENTION

This invention relates to multipurpose photographic film cassettes and more particularly, it concerns an improved apparatus for releasing processing fluid from an initially sealed reservoir forming part of a film processing organization of such cassettes.

Multipurpose photographic film cassettes have been developed for use in motion picture photographic systems illustrated and described, for example, in U.S. Pat. No. 3,615,127 issued to Edwin H. Land on Oct. 26, 1971 and in U.S. Pat. No. 3,623,417 issued Nov. 30, 1971 to Vito K. Eloranta both of which are owned by the assignee of the present invention. In such systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame by frame past a light source so that the scene to which the film was exposed is reproduced in a manner well-known in the motion picture art.

In systems of the type aforementioned, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed reservoir or pod housed within the film cassette, the reservoir having a removable closure capable of being opened upon activation of the processor by the viewing apparatus to allow the fluid to escape from the pod and pass through a nozzle-like opening against the exposed emulsion layer on the film strip.

To ensure retention of the processing fluid in the cassette contained reservoir or pod up to the time it is needed for the processing operation, and also in some measure to ensure complete availability of the processing fluid upon initial activation of the processor, the processing fluid reservoir in such systems is provided with a relatively large opening covered initially by a releaseably bonded tear-tab closure capable of being completely peeled from the opening to release the processing fluid for distribution against the emulsion layer of the exposed film strip. Although various techniques have been disclosed for removing the tear-tab closure to initiate the processing operation, the disclosure of copending application entitled "Processing Fluid Release Device for Multipurpose Film Cassettes" Ser. No. 428,377, filed Dec. 26, 1973 by J. Stella and also assigned to the assignee of the present invention, is especially noteworthy in this respect. In accordance with that disclosure, the release of processing fluid from the reservoir is brought about by a pull-strip extension connected at one end to a folded back portion of the reservoir sealing tear-tab and having at its free end, a configuration adapted to engage in an aperture formed in the leader end of the film strip attached to the supply spool during initial rewind rotation of the supply spool. The pull-strip, which may be mylar or other similar material having the physical characteristics of a photographic film strip, is initially supported and constrained to an essentially Z-shaped path in which the intermediate leg is established by a channel formed by internal cassette walls. At its exit from the channel, the pull-strip is bent back on itself without exceeding the elastic limits of the material from which it is made so that the projecting free end lies yieldably against the outer convolutions of the film strip on the supply spool. As the film strip pays out from the supply spool during exposure, the free end of the pull-strip will move inwardly due to the diminishing diameter of film strip convolutions on the supply spool until the film strip is completely exposed. At that time, an aperture in the supply spool connected leader end of the film strip will have passed the free end of the pull-strip extension so that upon rewinding of the film strip back onto the supply spool, the free end of the pull-strip will engage in a film strip aperture and become entrained between successive convolutions of the film strip supply spool leader. Continued rewind rotation of the supply spool will effect a pulling action on the pull-strip and correspondingly, a peeling of the tear-tab closure from the processing fluid reservoir to release the processing fluid for application thereof to the exposed film strip.

SUMMARY OF THE PRESENT INVENTION

In accordance with the present invention, there is provided an improved pull-strip release mechanism for removing the processing fluid reservoir closure automatically upon film strip rewind after exposure in a multipurpose cassette of the type referred to above. More particularly, provision is made as a result of the improvement for retaining the film strip engagable free end portion of the pull-strip out of contact with the film strip during exposure so that any possibility of damage to the photosensitive emulsion layer on the film strip during exposure will be avoided. The avoidance of film strip contact by the pull-strip is effected by a slidable keeper initially positioned to constrain the free end of the pull-strip in a spaced peripheral position about the cassette supply spool. The supply spool is provided with ratchet-like shoulders operable upon initial rewind movement to engage the keeper and slide it peripherally off of the free end portion of the pull-strip to allow the latter to spring yieldably against the supply and leader thereof to become engaged in an aperture and trained in the convolutions of the film strip during rewinding to pull the tear-tab closure from the processing fluid reservoir.

Among the objects of the present invention are: the provision of an improved multipurpose film cassette of the type referred to; the provision of an improved pull-strip mechanism for automatically releasing processing fluid from an initially sealed reservoir in the cassette upon rewind movement of the film strip after exposure; the provision of such a pull-strip mechanism by which unnecessary contact of the pull-strip with the film strip is avoided during film strip exposure; and the provision of such a pull-strip mechanism which requires a minimal number of parts, is easily assembled during manufacture and enables a retention of the desirable attributes of multipurpose film cassettes of the type described above.

Other objects and further scope of applicability of the present invention will become apparent from the

DETAILED DESCRIPTION OF THE PREFERRED EMBODIMENT

Figure 1:
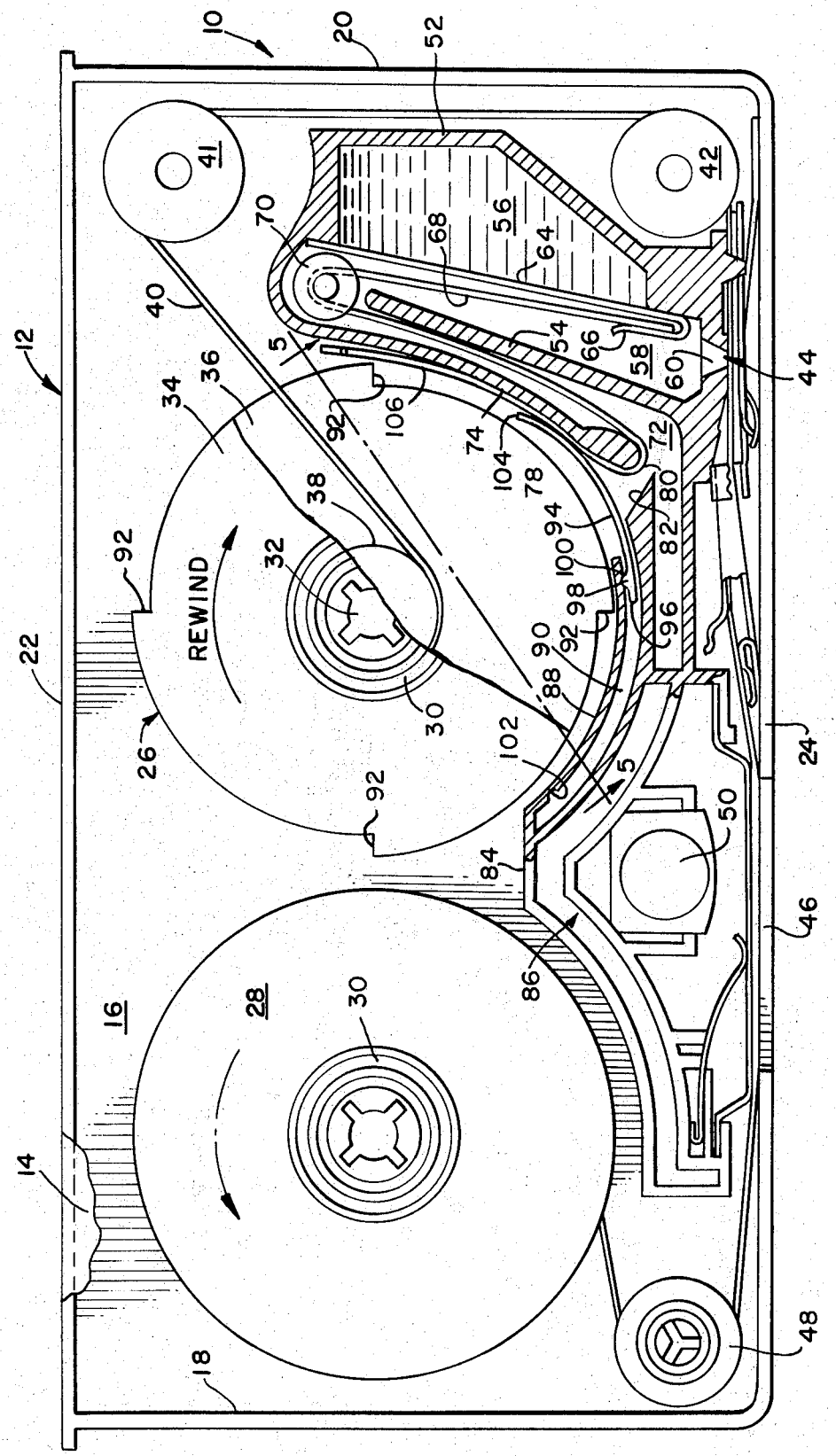
FIG. 1 is a side elevation of the film cassette of this invention with the front wall thereof cut away and other portions thereof in partial section to illustrate the internal working components.

In the drawings, the improved multipurpose cassette of the present invention is generally designated by the reference numeral 10. As shown in FIG. 1, the cassette includes a generally parallelepiped casing or housing 12 established by planar faces or side walls 14 and 16, end walls 18 and 20 and elongated top and bottom edge walls 22 and 24, respectively. A pair of spools respectively designated hereinafter as a supply spool 26 and a take-up spool 28 are supported rotatably in the housing by annular, light-tight bearings 30 on the spools engaged by complementing ring-like embossments (not shown) on the interior of the side walls 14 and 16. Also each spool is provided with a drive socket 32 for engagement by appropriate drive shafts in either of the camera (not shown) or the viewing apparatus (not shown) with which the cassette is used in accordance with the overall system described in the prior patents above cited. Each of the spools 26 and 28 is provided further with a pair of opposed flanges 34 and 36 affixed to opposite ends of central hubs 38 to which opposite ends of a film strip 40 are permanently connected. The path of the film strip 40 in the housing 12 extends through a loop from the hub 38 of the supply spool 26 about guide rollers 41 and 42 across a normally inoperative film processing station 44, an opening 46 in the bottom edge wall 24, about a further guide roll 48 and to the take-up spool 28. The opening 46 functions at different times to facilitate both exposure and projection of the film strip 40, a prism 50 being located behind the film strip at the opening 46 to facilitate the latter operation.

Also as shown in FIG. 1 of the drawings, the processing station 44 is formed in part by internal cassette transverse wall formations 52 and 54 defining in part a pair of chambers 56 and 58, the latter of which opens at its bottom to a processing fluid applicator nozzle 60 positioned to overlie the emulsion carrying surface of the film strip 40 as it passes between the cassette exposure-projection opening 46 and the guide roller 42. The chamber 56 constitutes an initially sealed reservoir for processing liquid and opens along one side to the chamber 58 at a planar face 62 to which a releaseable tear-tab closure 64 is initially affixed by bonding, fusion or the like. It should be noted that although the wall formation defining the respective chambers 56 and 58 as well as the nozzle 60 are depicted as one piece in FIG. 1 of the drawings, in practice the processing liquid handling functions served by the illustrated structure may be served equally well by more easily assembled separate components. For example, as shown in FIG. 1 the chamber 56 provides in itself an initially sealed processing liquid reservoir whereas in practice, the chamber may provide an internal receptacle for a prefabricated and self-contained pod of processing liquid to which the tear-tab closure 64 is affixed in essentially the same manner as that shown in FIG. 1. In this way cassette assembly can be facilitated without compromise in the achievement of a completely sealed reservoir for the processing fluid.

Figure 2:
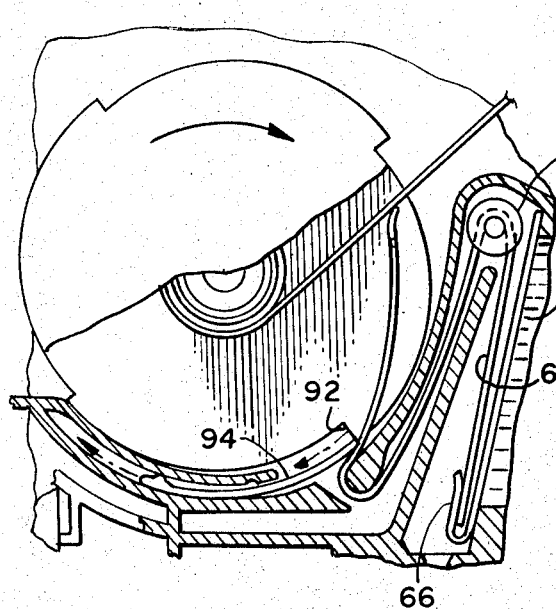
FIGS. 2 and 3 are cut-away fragmentary side elevations illustrating the cassette supply spool as well as the pull-strip mechanism for removing the fluid reservoir tear-tab closure during different phases of the initial processing film strip processing cycle.
Figure 3:
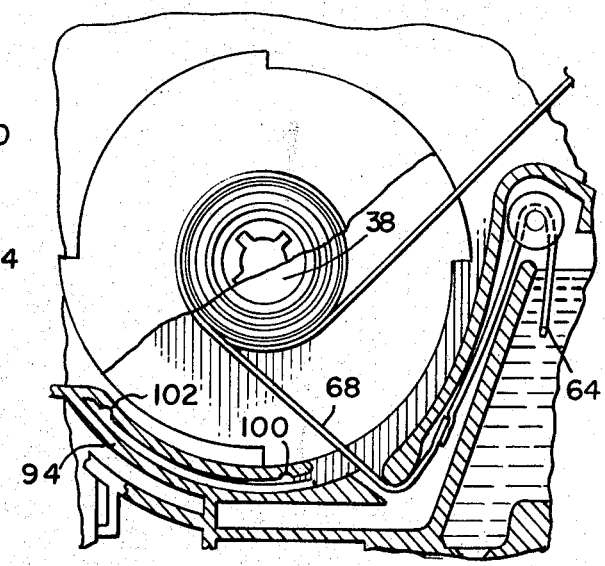
Figure 4:
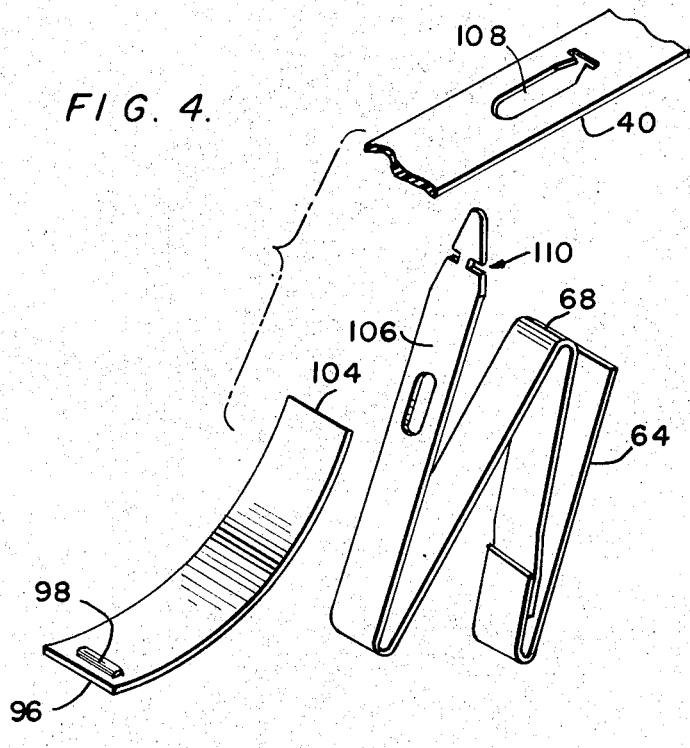
FIG. 4 is an enlarged exploded perspective view illustrating the pull-strip release mechanism of the invention.

The tear-tab 64, as shown in FIGS. 1 and 2 of the drawings, extends from the top of the chamber 56 downwardly over the planar face 62 to the bottom of the chamber and near the nozzle 60 and is reversely folded or bent at its bottom to establish an upwardly directed leading end portion 66 secured by bonding, fusion or other suitable means to one end of a pull-strip extension 68. As described in the aforementioned copending application, the securement of the tear-tab to the pull-strip extension in lap joint fashion so that the pull-strip 68 initially lies within the reverse bend of the tear-tab, as illustrated, is important to the achievement of separation of the pull-strip from the tear-tab closure after these components have served their processing function.

The pull-strip 68 extends upwardly from the lap joint with the tear-tab closure portion 66, about a guide roller 70 and downwardly through a channel 72 defined in part by the wall formation 54 and in part by another transverse wall formation 74. The wall formation 74 extends in arcuate fashion about the periphery of the supply spool 26 and is interrupted at a radius portion 78 establishing one side of an exit opening 80 from the channel 72 and through which the pull-strip 68 passes after a second reverse bend thereby to establish an initial essentially Z-shaped configuration in the pull-strip. The pull-strip is formed by any suitable resilient material such as mylar or other material having physical characteristics comparable to the strip of photographic film. The condition in which the pull-strip 68 is initally supported in passing about the roller 70 and the radius portion 78 effects a stressing of the material from which the extension is formed but within its elastic limit so as to provide an inherent bias tending to restore the extension to an initially straight condition.

Also in accordance with the aforementioned copending application, the arcuate wall formation 74 is provided with a knife edge portion 82 on the opposite side of the exit opening 80 from the radius portion 78 to effect a severence of the tear-tab closure 64 from the pull-strip 68 as the latter is pulled into the convolutions of the film strip 40 rewound onto the supply spool 26 during the processing operation. Because of this structure, the channel 72 serves as a storage chamber for the tear-tab closure 64 after the processing operation is completed.

Also as shown in FIG. 1, the arcuate wall formation 74 extends past the exit opening 80 to the apex 84 of a light seal wall formation projecting transversely from the side wall 16 of the cassette housing 12. As disclosed in the aforementioned patents, the light seal functions to prevent leakage of light through the prism 50 to the interior of the cassette housing 12 during handling of the cassette 10 until the film strip 40 therein has been processed.

Figure 5:
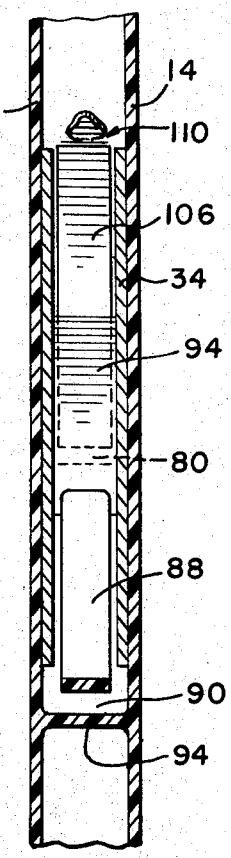
FIG. 5 is an enlarged fragmentary cross-section taken on line 5—5 of FIG. 1.

In accordance with the present invention, an arcuate tongue 88 extends in cantilever fashion from the apex portion 84 of the light seal 86 back about the periphery of the supply spool 26 in spaced relation to the wall formation 74 to establish an annular space sector 90. As shown in FIG. 5, the width of the tongue 88 is less than the transverse spacing between the flanges 34 and 36 on the supply spool 26 so that it may extend within the periphery of the supply spool flanges without interference of supply spool rotation. Also at this point it is to be noted that the supply spool flanges 34 and 36 are provided at their outer periphery with ratchet-like shoulders 92 facing in the direction of rewind rotation of the supply spool 26.

Slidably received in the arcuate annular sector 90 between the tongue 88 and the arcuate wall formation 74 is an arcuate keeper 94 provided near one end 96 with a detent projection 98 engagable in one or the other of first and second detent recesses 100 and 102, respectively, formed in the underside of the tongue 88.

The keeper 94 may be formed of any suitable light-weight resilient material such as metal, plastic material, impregnated fiber and the like. The keeper 94 is further formed to retain an initial arcuate configuration with a radius less than the radius of the arucate wall formation 74 so that the free end 104 of the keeper will project slightly inwardly of the arcuate wall formation 74 when the other end 96 thereof is retained against the wall formation by engagement of the detent projection in the detent recess 100 at the terminal end of the tongue 88. Also in this position and as shown in FIG. 1, the keeper 94 will bear against the free end portion 106 of the pull-strip 68 projecting through the exit opening 80 so as to hold the free end portion 106 of the pull-strip 68 against the arcuate wall formation 74 and out of contact with the film strip 40 or convolutions thereof wound on the supply spool prior to exposure of the film strip.

The width of the keeper 94 as shown in FIG. 5, unlike the width of the tongue 88 is greater than the spacing between the interior surfaces of the supply spool flanges 34 and 36 so as to lie in the path of the ratchet-like shoulders 92 on the spool flanges as the supply spool is rotated.

The operation of the improved cassette and particularly the operation of the keeper 94 during use of the cassette may now be understood. As initially assembled, the cassette will contain the unexposed film strip 40 wrapped in convolutions on the supply spool 26 but having at least a leader portion extending to the take-up spool 28 through the path described above. Also at this time, the condition of the tear-tab closure 64, the pull-strip 68 as well as the keeper 94 will be as illustrated in FIG. 1 of the drawings such that the keeper 94 holds the free end portion 106 of the pull-strip 68 against the arcuate wall formation 74. The cassette in this condition will be placed in a camera (not shown) so that the film strip will be exposed by incremental advance from the supply spool 26 to the take-up spool 28. After exposure, the cassette is placed in a viewing apparatus (not shown) for processing and subsequent projection.

The processing cycle is initiated automatically by rewinding the film strip from the take-up spool 28 to the supply spool 26. Upon initial rewind rotation of the supply spool 26, the ratchet-like shoulders 92 thereon will engage the free end 104 of the keeper 94 and advance the keeper in a rewind direction so that the detent projection 98 thereon moves out of the first detent recess 100 on the tongue 88 and will be slid into the arcuate annular sector 90 until the projection 98 engages in the detent recess 102. Upon reaching this position, the free end portion will be urged by the tongue 88 beyond the outer periphery of the supply spool so that the ratchet-like shoulders 92 no longer engage the free end 104 of the keeper.

Concurrently with movement of the keeper in the aforementioned manner, the free end portion 106 of the pull-strip 68 will move under its inherent resiliency in between the flanges of the supply spool to a position against the film strip 40. As described in the aforementioned copending application, the supply leader end of the film strip 40 is provided with a shaped aperture 108 into which a latch tongue formation 110 at the free end of the strip 68 engages so that the pull-strip will become entrained between the convolutions of the strip 40 being rewound on the supply spool 26. Continued rewind movement of the supply spool will effect a pulling of the pull-strip 68 and concurrent peeling of the tear-tab closure 64 to release the liquid in the reservoir chamber 56 for distribution on the emulsion layer of the film strip through the nozzle 60. Also as described in the aforementioned application, the knife edge portion 82 will separate the pull-strip 68 from the tear-tab closure 64 so that the latter is retained in the channel-like chamber 72 after its removal from the reservoir chamber 56.

Thus it will be seen that as a result of the present invention, the above-mentioned objectives are fulfilled by a highly effective and simple mechanism for effecting release of the processing liquid in the reservoir chamber 56 and requiring no external means other than a connection of a spindle in the viewer with the socket 32 of the supply spool 26. Also it will be apparent to those skilled in the art that modifications or changes can be made in the disclosed embodiment without departure from the spirit or scope of the present invention. It is expressly intended therefore that the foregoing description is illustrative of a preferred embodiment only, not limiting, and that the true spirit and scope of the present invention will be determined from the appended claims.

What is claimed is:

1. In a multipurpose film cassette of the type containing for exposure and processing a strip of photographic film connected at opposite ends to supply and take-up spools, processing means also contained in the cassette and including a supply of processing fluid initially sealed by a releaseable tear-tab closure to be removed after film strip exposure for deposition of the processing fluid on the film strip during rewind movement thereof from the take-up spool to the supply spool, the film strip having an aperture near the end thereof connected to the supply spool to receive and latchingly engage the free end of a resilient pull strip joined at its other end to the tear-tab closure, the improvement comprising:

movable keeper means for holding the free end portion of the pull-strip out of contact with the film strip during passage thereof from the supply spool to the take-up spool during exposure; and means for moving said keeper means away from the free end portion of the pull-strip to an inoperative position after exposure, thereby to allow the free end portion of the pull-strip to spring resiliently into contact with the film strip to engage the aperture therein and be pulled with the film strip on rewind to remove the tear-tab closure from the supply of processing fluid.

2. The apparatus recited in claim 1 wherein said means for moving said keeper means comprises one-way keeper engaging means on the supply spool and operative on rewind rotation of the supply spool to move said keeper means.

3. The apparatus recited in claim 1 wherein said keeper means comprises a plate-like member slidable from a holding position overlying the free end portion of the pull-strip to said inoperative position.

4. The apparatus recited in claim 3 including internal cassette wall formation means to guide said plate-like keeper member between said positions.

5. The apparatus recited in claim 4 wherein said wall formation guiding means defines an arcuate path through which said keeper means is moved between said positions, said arcuate path lying outwardly of the supply spool, movement of said keeper means from said holding position to said inoperative position being in the direction of supply spool rotation on rewind of the film strip from the take-up spool.

6. The apparatus recited in claim 5 including peripheral ratchet means on the supply spool and wherein said plate-like keeper means is provided with a leading edge positioned in the path of said ratchet means in said holding position and, said arcuate path being oriented to the rotational axis of the supply spool so that upon movement of said keeper means to said inoperative position, said leading edge disengages from said ratchet means due to movement of said edge peripherally outward beyond said ratchet means.

7. The apparatus recited in claim 6 including detent means for yieldably retaining said keeper means in said positions respectively.

8. In a multipurpose film cassette having a housing to contain for exposure, processing and viewing, a strip of photographic film having at opposite ends supply and take-up leaders connected respectively to supply and take-up spools each having flanges spaced to receive the film strip in successive convolutions, the spools being rotatably mounted in the casing, processing means also contained in the housing and including a supply of processing fluid initially sealed by a releasable tear-tab closure to be removed after film strip exposure for deposition of the processing fluid on the film strip during rewind movement thereof from the take-up spool to the supply spool, the supply leader of the film strip having an aperture therein to receive and latchingly engage the free end of a resilient pull-strip joined at its other end to the tear-tab closure, the supply spool being at least partially circumscribed by an arcuate transverse wall formation within the housing spaced outwardly of the supply spool flanges and having an opening through which the free end of the pull-strip projects for extension between the flanges of the supply spool to engage the aperture in the supply leader of the film strip, the improvement comprising:

movable keeper means for holding the free end portion of the pull-strip against the arcuate wall formation and thus out of contact with the film strip during passage thereof from the supply spool to the take-up spool during exposure; and ratchet means on the periphery of the supply spool flanges for moving said keeper means to an inoperative position and in the direction of supply spool rotation on rewind passage of the film strip from the take-up spool after exposure, thereby to allow the free end portion of the pull-strip to spring resiliently into contact with the film strip supply leader to engage the aperture therein and be pulled with the film strip on rewind to remove the tear-tab closure from the supply of processing fluid.

9. The apparatus recited in claim 8 wherein said keeper means is an arcuate plate-like member having a width greater than the internal spacing between the supply spool flanges and having a leading edge to be engaged by said ratchet means.

10. The apparatus recited in claim 9 including an arcuate tongue formation cantilevered from the arcuate transverse wall formation and defining therewith an annular sector for retaining and guiding said keeper.

11. The apparatus recited in claim 10 wherein the arcuate plate-like keeper is retained in a holding position against the free end portion of the pull-strip by said tongue formation so that the leading edge thereof projects inwardly toward the supply spool to be engaged by the ratchet means on the periphery thereof.

12. The apparatus recited in claim 11 including detent means cooperable between said tongue formation and said keeper for yieldably retaining said keeper in said holding and inoperative positions respectively.

13. A system for treating an elongated strip of photographic material with a processing fluid, said system comprising:

means for releasably storing a sufficient quantity of the fluid to treat the substantially entire length of the strip of photographic material, said fluid storing means including a tear-tab closure element;

means for applying the fluid to an incremental section of the strip of photographic material when the fluid is released from said fluid storing means;

means when driven for progressively advancing the strip of photographic material into operative relationship with said fluid applying means; and means for selectively releasing the fluid from said fluid storing means, said fluid releasing means including a member extending from said tear-tab closure element, said extending member being configured and arranged to transfer a force from said advancing means to said tear-tab closure element causing the fluid to be released from said fluid storing means, means for rendering said extending member inoperative to transfer said force to said tear-tab closure element and means for automatically disabling said inoperative rendering means responsive to said advancing means reaching a predetermined condition.

14. The system of claim 13 wherein said extending member is resilient and said inoperative rendering means biases said extending member out of a given position wherein it is operative to transfer said force to said tear-tab closure element.

15. The system of claim 14 wherein said advancing means comprises a spool to which the strip of photographic material is connected and said extending member contacts the strip of photographic material when in its said operative position which it assumes after said disabling means is actuated responsive to said advancing means reaching its said predetermined condition.

16. The system of claim 15 wherein complementary locking means are formed on the strip of photographic material and said extending member.

17. The system of claim 15 wherein said disabling means comprises flange means on said spool.

* * * * *